(12) United States Patent
Griffis et al.

(10) Patent No.: US 7,617,167 B2
(45) Date of Patent: Nov. 10, 2009

(54) MACHINE VISION SYSTEM FOR ENTERPRISE MANAGEMENT

(75) Inventors: Andrew J. Griffis, Tucson, AZ (US); Roger Karl Mikael Undhagen, Tucson, AZ (US); Tinku Acharya, Chandler, AZ (US)

(73) Assignee: Avisere, Inc., Tucson, AZ (US)

( * ) Notice: Subject to any disclaimer, the term of this patent is extended or adjusted under 35 U.S.C. 154(b) by 361 days.

(21) Appl. No.: 10/820,906

(22) Filed: Apr. 8, 2004

(65) Prior Publication Data

US 2007/0090180 A1 Apr. 26, 2007

Related U.S. Application Data

(60) Provisional application No. 60/461,594, filed on Apr. 9, 2003.

(51) Int. Cl.
*G06N 5/00* (2006.01)
*G06F 17/00* (2006.01)

(52) U.S. Cl. .................. 706/45; 235/376; 701/214; 726/27

(58) Field of Classification Search ............ 709/203; 701/214; 706/45
See application file for complete search history.

(56) References Cited

U.S. PATENT DOCUMENTS

| 5,960,097 | A | * | 9/1999 | Pfeiffer et al. ............. 382/103 |
| 6,697,103 | B1 | * | 2/2004 | Fernandez et al. .......... 348/143 |
| 2002/0104013 | A1 | * | 8/2002 | Ghazarian ................... 713/200 |
| 2004/0043758 | A1 | * | 3/2004 | Sorvari et al. ............ 455/414.1 |

* cited by examiner

*Primary Examiner*—David R Vincent
*Assistant Examiner*—Kalpana Bharadwa
(74) *Attorney, Agent, or Firm*—Lawrence R. Oremland, P.C.

(57) ABSTRACT

A system for use in managing activity of interest within an enterprise is provided. The system comprises a computer configured to (i) receive sensor data that is related to key activity to the enterprise, such key activity comprising a type of object and the object's activity at a predetermined location associated with the enterprise, the sensor providing information from which an object's type and activity at the predetermined location can be derived, (ii) process the sensor data to produce output that is related to key activity to the enterprise, and (ii) store the information extracted from the processed data in a suitable manner for knowledge extraction and future analysis. According to a preferred embodiment, the object is human, machine or vehicular, and the computer is further configured to correlate sensor data to key activity to the enterprise and the output includes feedback data based on the correlation.

8 Claims, 6 Drawing Sheets

System/Functional Diagram for the Invention

Figure 1. System/Functional Diagram for the Invention

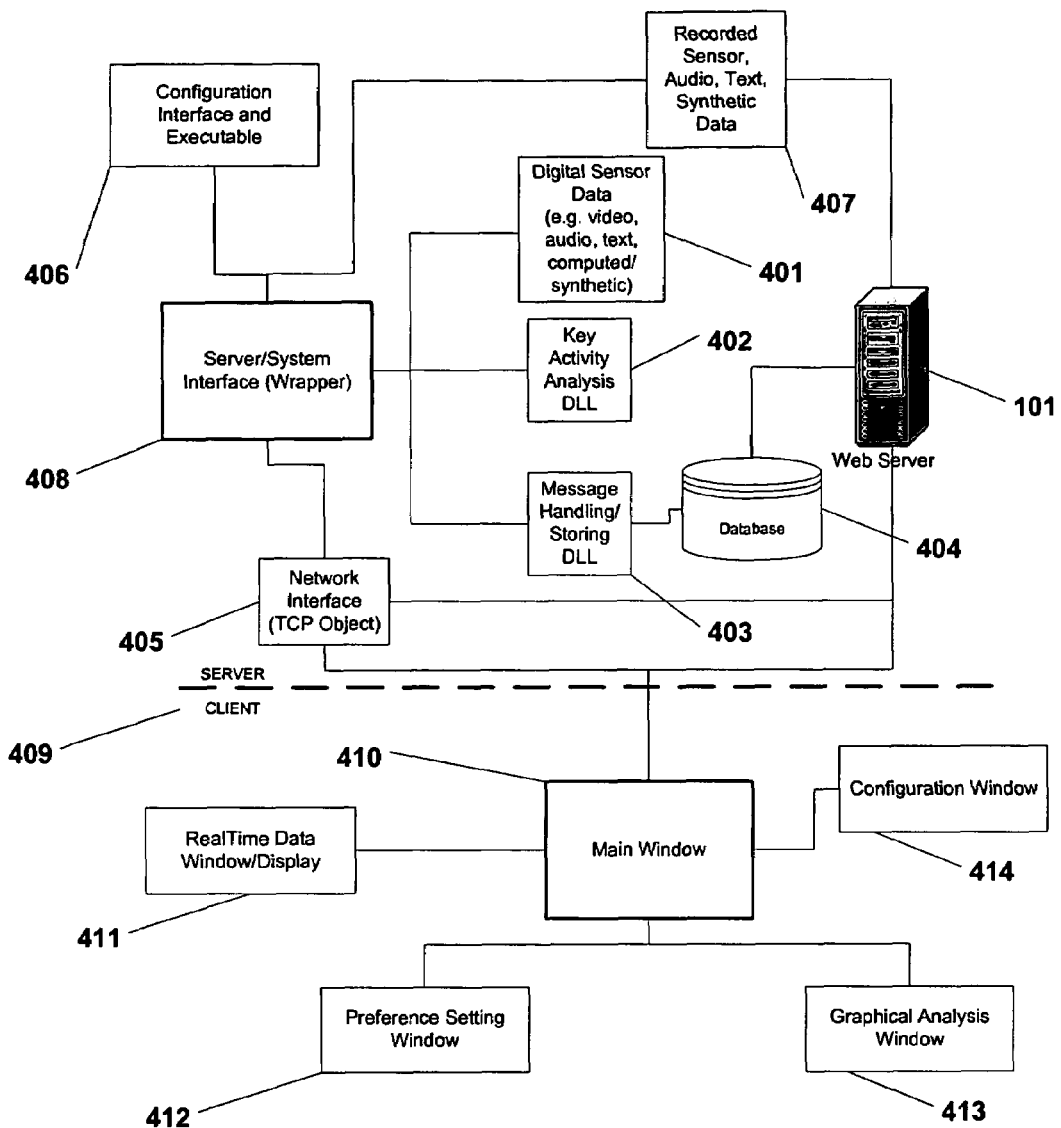
Figure 4. Example: Invention deployed in a client/server configuration. The lower half represents the client side and the upper half is the server.

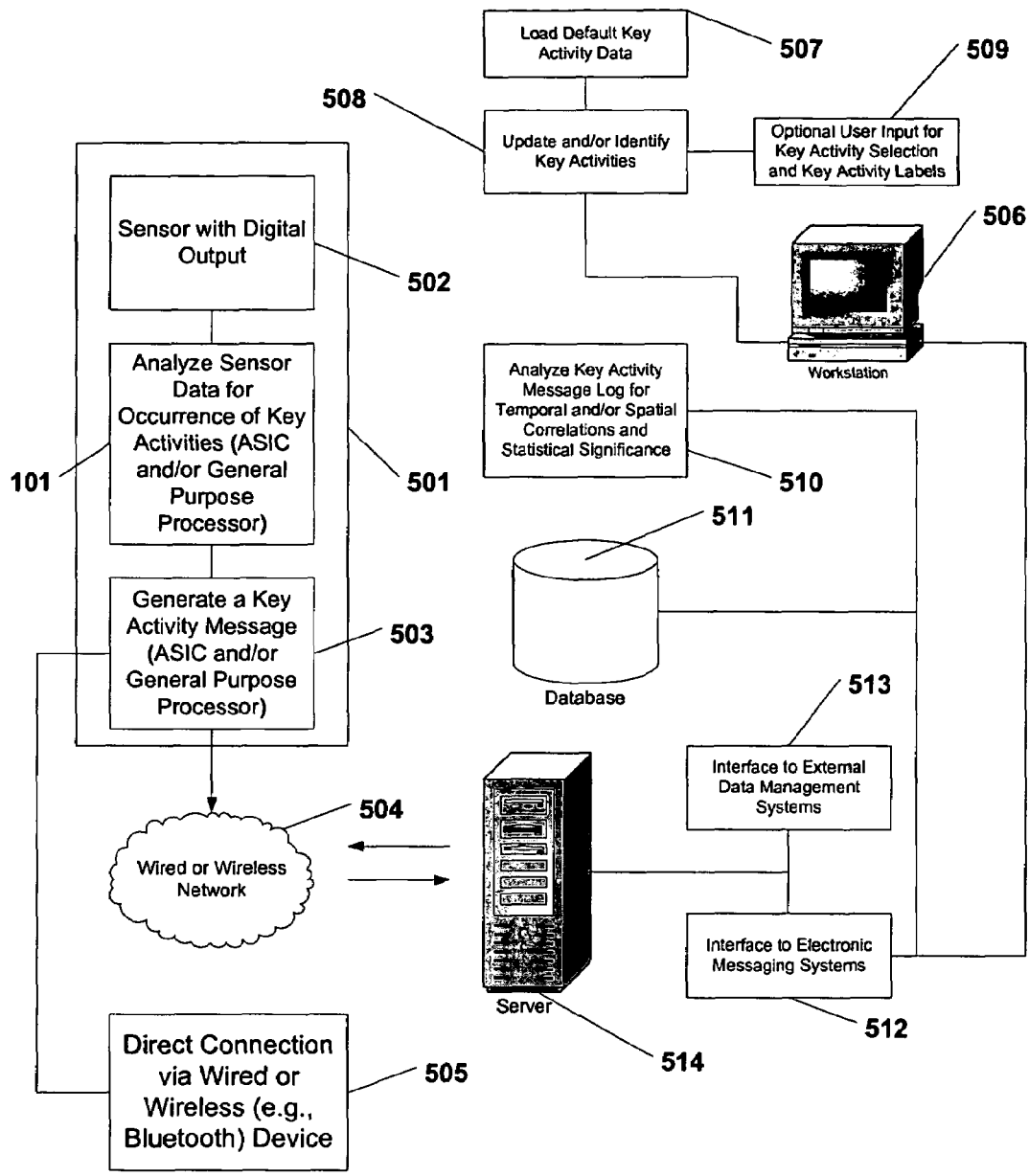
Figure 5. Example: Invention deployed in an embedded configuration

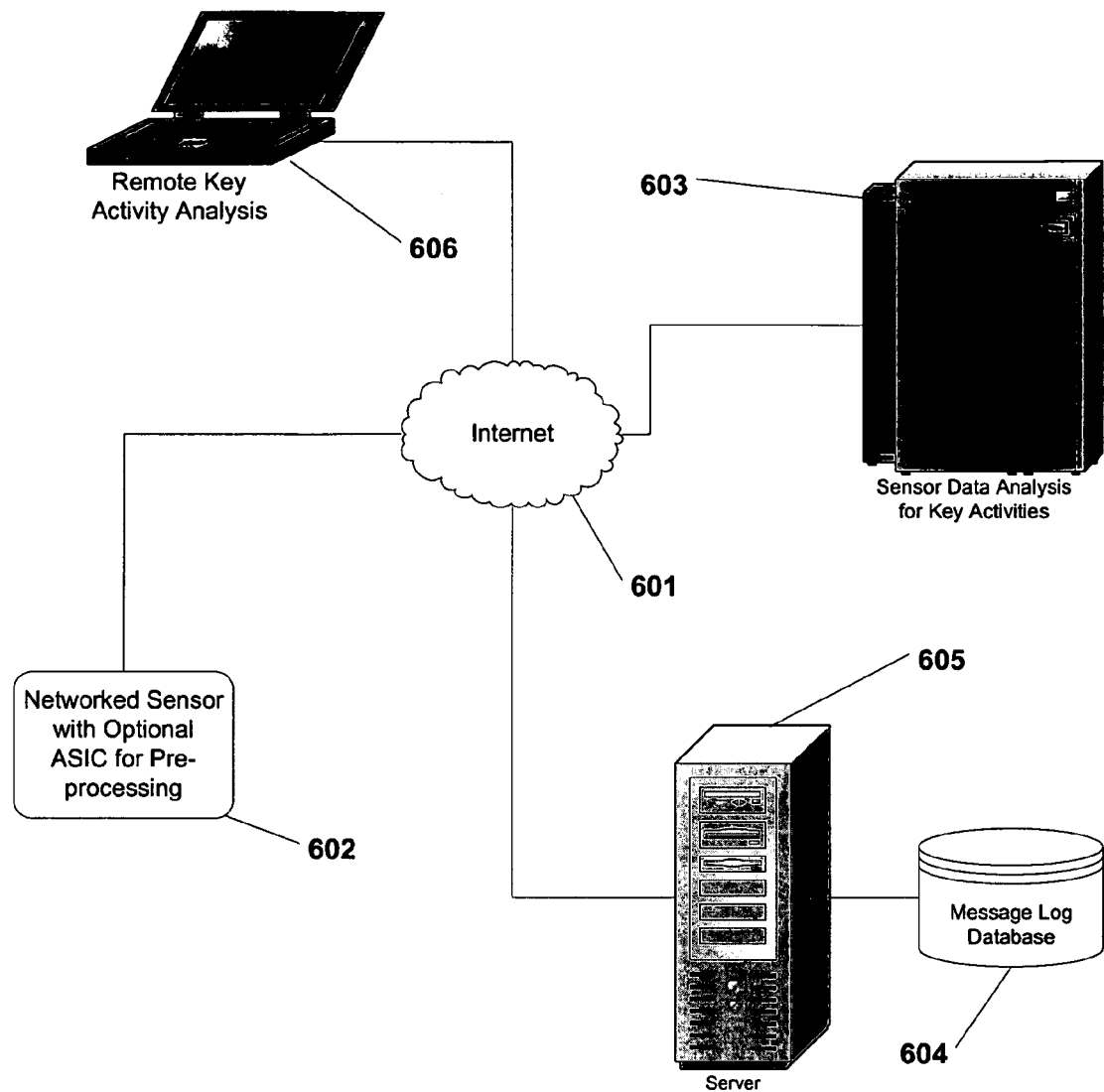
Figure 6. Example: Invention modular design

MACHINE VISION SYSTEM FOR ENTERPRISE MANAGEMENT

RELATED APPLICATION/CLAIM OF PRIORITY

This application is related to and claims priority from U.S. provisional application Ser. No. 60/461,594, filed Apr. 9, 2003, which provisional application is incorporated by reference herein.

BACKGROUND OF THE INVENTION

The invention relates to the field of machine (e.g., computer) vision and its application to the optimization and utilization of human activity and/or interaction within an enterprise (e.g., a business, neighborhood, home, other region or area of concern) to monitor events and aid in the automated or semi-automated decision making process to manage the enterprise efficiently and responsibly.

Because of the proliferation of both computer and electronic sensor technology in the past 20 years, and owing to persistent fascination with having a machine (e.g., computers, but not limited to) provide functions that normally require human intelligence, the field of machine vision has matured significantly in both theory and practice in recent years. This maturation has been accompanied by many demonstrations and publications of demonstrations of using machine vision algorithms running on commercially available computers and using commercially available sensors (e.g., visible light focal plane arrays) to deduce sensor data events (e.g., motion or other change), to separate human related events from other events, to recognize objects that are both moving and stationary in sensor data and to recognize specific activities implied by the events deduced from the sensor data.

Most of this activity in applied and theoretical machine (e.g., computer) vision has been directed at the advanced areas of robotics and biometrics (the positive identification of a person), in which attempts are made to mimic the rich perception capabilities of humans for understanding their own interaction with their surroundings or in being able to deduce the unique personal features (e.g., facial characteristics, movement, gait, etc.) of other people to aid in uniquely identifying them. These are, of course, significantly difficult problems to address and remain an ongoing challenge for researchers in machine vision.

However, as a result of much of the research community having focused their machine vision efforts on the long term objectives of human perception and biometric recognition, and since these, with only a few exceptions, remain largely unsolved at a level suitable for full commercial exploitation, the significant advances made to date have not found application in commercial products, even though there are applications for which the machine vision technology (as available in the open literature and open source code processing components) can currently be utilized to provide significant commercial value to retail, wholesale, manufacturing concerns and municipalities as well.

What is missing to date is a system design and architecture that integrates elements of machine vision algorithms and commercially relevant human activities with an enterprise (e.g., a business, neighborhood, home, other region or area of concern) network and communications infrastructure, so that the progress in machine vision to date for observing objects, basic human activities and fundamental events (e.g., motions or other changes) can be used to provide valuable and timely information (e.g., situational awareness) about the ongoing operation of the enterprise.

The invention disclosed, herein, articulates a novel system design that uses sensor data (e.g., machine vision) events and combines them with key activity identifiers (e.g., specific human activity, animal activity, or interactions between humans, animals, machines, etc.) so that event data from sensors can be made available to decision logic for both real time (e.g., instant message, as an example, but not limited to) and delayed (e.g., database server, data mining application service, but not limited to) notification and/or recording of events and interrelationships of interest to a commercial, municipal type public enterprise or private enterprise, many of which enterprises also have a customer service oriented environment. Furthermore, the system architecture of this invention enables the application of machine vision technology to automated or semi-automated enterprise situational awareness for deducing and optimizing the value (e.g., commercial value, but not limited to) of human interaction with other human subjects and/or animals (as these are commonly found in many enterprises and are known to be associated with human activity in some settings) and/or enterprise equipment in use by or associated with the human subjects.

What this invention does that has not been done to date is to provide a automated or semi-automated system design that gives non-practitioners in the field of machine vision and statistical data analysis access to advanced machine vision and statistical data analysis capabilities for use in improving or enhancing the effectiveness of an enterprise and its management in which human activity figures prominently in either the use of the enterprise itself (e.g., a residence or office building) or the use of the enterprise for production, sale or purchase of saleable product (e.g., an electronics assembly facility, a restaurant, a retail consumer goods store, etc. to name a few, but not limited to).

As used in this disclosure, an event is a phenomenon that occurs in the scene of particular interest viewed by the sensor that may be of particular interest to a particular user of the invention. Since the purpose of the invention is to provide situational awareness to a user having particular enterprise-related concerns, not all events result in a communication (e.g. message) to the user. Rather, events are communicated to a user only insomuch as they are similar to events that the user determines are important, or that are deemed important by the invention through evidence of significance implied by the temporal and/or spatial behavior of event data (e.g., an event not easily confused with mere randomness in sensor data occurs at a time that is highly unusual, an event occurs repeatedly over time, or repeatedly in the same place, etc., to name a few examples).

For this disclosure, these events are key activities. From this it follows that a key activity message that is useful in enterprise management will contain any or all of five elements: 1) what object is moving or changing (person, animal, vehicle, machine, other inanimate object) 2) what behavior the moving or changing object is engaged in, 3) where the object is located, 4) when the motion or change is occurring and 5) measurable interpretation of the change in phenomena or activity in order to make a decision by a machine or a human for a purpose.

Events that may be of interest to a retail store user would, for example, include the length of a line at the cash register exceeding three people (as an example), or some other number that the user deemed unacceptably high. An example of an event of interest to a neighborhood organization, for instance, would be a vehicle that appears in an alley several nights consecutively when people in the neighborhood are sleeping. An example event that might be of interest for roadways and transportation concerns is the number of people in line waiting to cross a busy street at which a traffic signal has been placed.

SUMMARY OF THE INVENTION

The invention disclosed herein describes a system for use in managing activity of interest within an enterprise, comprising a computer configured to (i) receive sensor data that is related to key activity to the enterprise (such sensor data comprising data that is taken in by a sensor at a predetermined location irrespective of object compliance, and such key activity comprising an object, and the state of activity for the object with respect to the state of activity for other physically distinct objects in the sensor data), and (ii) process the sensor data to produce output that is related to key activity to the enterprise.

According to a preferred embodiment, the computer is further configured to correlate combinations of past and present sensor data and key activity to the enterprise and the output includes feedback data based on the correlation.

The invention applies machine (e.g., computer) vision algorithms that use activity identifiers (e.g., data models, data records) applied to time series of sensor data (e.g., digital video image sequences on-line or off-line, different types of multimedia data) in order to detect events that have relevance to the user of the invention (e.g., the enterprise manager). The invention applies decision logic, based on the knowledge discovery and information extraction through mining the available data using a computing system, regarding the statistical significance of these events to generate messages that can be sent immediately and/or stored for subsequent processing.

As used in this disclosure, sensor data is quantitative information collected at a predetermined location and time at or near the enterprise, that can be used to deduce, using machine vision algorithms, events and key activities for the enterprise. Sensor data is collected at the predetermined location irrespective of object compliance, meaning that the information about the object deduced by the invention is gathered without the participation of the object, in contrast to information that requires participation of the object for a typical biometric (e.g., fingerprint, face recognition, iris recognition, etc.) system.

As used in this disclosure, an object is any physical entity, such entity being either animate or inanimate. Animate objects are regarded as being either animals/creatures, humans, or machines. Inanimate objects are regarded as being either man-made or natural. Man-made objects are further regarded as being either machines, structures, furnishings or implements (e.g., tools, weapons, to name a few).

As used in this disclosure activity is motion in space and time such as would be observed by an object that is itself moving or is being moved, and includes the case for which no motion is occurring regarding an object.

As used in this disclosure, an enterprise is a business, neighborhood, home, or other physical region or area of concern to one that is responsible for managing or monitoring activity within.

As used in this disclosure, an event is a phenomenon that occurs in the scene of particular interest observed by the sensor that may be of particular interest to a particular user of the invention. Since the purpose of the invention is to provide situational awareness to a user having particular enterprise-related concerns, not all events result in a communication (e.g. message) to the user. Rather, events are communicated to a user only insomuch as they are similar to events that the user determines are important, or that are deemed important by the invention through evidence of significance implied by the temporal and/or spatial behavior of event data (e.g., an event not easily confused with mere randomness in sensor data occurs at a time that is highly unusual, an event occurs repeatedly over time, or repeatedly in the same place, etc., to name a few examples).

For this disclosure a key activity is an event (or set of events) that the user determines is important, and/or that is deemed important by the invention through evidence of significance implied by the temporal and/or spatial behavior of event data. An output comprising a key activity message that is useful in enterprise management will contain any or all of five elements: 1) what is moving or changing (person, animal, machine, other inanimate object) 2) what behavior the moving or changing object is engaged in, 3) where the object is located, 4) when the motion or change is occurring and 5) measurable interpretation of the change in phenomena or activity in order to make a decision by a machine or a human for a purpose.

Events that may be of interest to a retail store user would, for example, include the length of a line at the cash register exceeding three people, or some other number that the user deemed unacceptably high. An example of an event of interest to a neighborhood organization, for instance, would be a vehicle that appears in an alley several nights consecutively when people in the neighborhood are sleeping.

The event messages that are generated by the invention can be stored in a format (e.g., database) suitable for use with commercially available statistical analysis software. However the preferred embodiment inherently provides analysis of the recorded information for spatial and temporal correlation of events, signaling the enterprise principal(s) to examine these correlations and the underlying activity events when points of statistical significance are reached. Furthermore, with this inherent analysis of recorded information taking place on an ongoing basis, the system can then provide automatic updates to the key activity data of interest, thereby eliminating the need for an analyst/observer to review either the data produced by the system on ongoing basis, other than to gain an understanding of the underlying events that lead to messages.

In this way, an enterprise principal can be alerted to the existence of events that are interrelated in important ways to the operation of the enterprise, even though these events could not be faithfully observed by a single observer or necessarily conceived of having been related. This is true even given an observer manually viewing the sensor data, recognizing the limitations on the vigilance and endurance of human operators to perform such duties with consistency.

Finally, in order to safeguard the event data and raw sensor data that passes between a sensor and the remaining computer and communications infrastructure, especially when an embedded implementation (e.g., sensor and dedicated computing resources are co-located inside a single enclosure and often does not require any operating system) of the machine vision algorithm is used, the invention preferably uses a combination of embedded and application layer (e.g., in the context of an operating system and accessible by computer users) encryption or other security measures of the event data and raw data to safeguard the operation of the system and the integrity of the components involved (e.g., to prevent commercial espionage of enterprise data).

In the applicant's experience, existing systems do produce data for analysis, but do not use the data to automatically signal coincidences and/or statistical significance in order to aid automated decision management systems. So this invention expands the state of the art in, e.g., operations research, by providing technology from machine vision, pattern recognition, communications, systems, multimedia processing, networking, statistics and relevant knowledge extraction principles. Applications anticipated for this invention include, but are not limited to: hotel and restaurant management, retail point of sale management and customer relations, elderly care management and quality assurance, health care management, manufacturing and plant management for quality and safety, municipal and/or neighborhood security, safety, land use and transportation and roadway applications.

Other features of the present invention will become apparent from the following detailed description and the accompanying drawings.

BRIEF DESCRIPTION OF THE DRAWINGS

The subject matter of this application is particularly pointed out and distinctly claimed in the concluding portion of the specification. The claims, however, both as to organization and method of operation, together with objects, features, and advantages thereof, may best be understood by reference of the following detailed description when read with the accompanying drawings in which:

FIG. 4 shows an example of the invention deployed as a client-server system such as might be deployed using conventional personal computer and server computer technology.

FIG. 5 Shows the invention deployed in an embedded configuration, such as would be appropriate to a remote location that has limited network, power or security resources, or which benefits from embedded technology in some other way.

FIG. 6 illustrates the modular design potential of the invention, which allows it to be deployed in many settings, such as those described in FIGS. 4 and 5.

The details of these drawings are delineated in the following section of this disclosure.

DETAILED DESCRIPTION OF THE INVENTION

An Illustrative Example

In order to help convey the intent of the invention, an example of one use of the invention toward commercial ends is instructive. The example to consider is a familiar one: the mass market restaurant that serves several meals a day, is either franchised or owned by a parent corporation, serves food from a counter and a drive-through window and sees significant volume of traffic throughout the day. Such a setting is one wherein a single on-site manager cannot hope to maintain full cognizance of the overall operation of the establishment either in real time or upon reflection upon a day's events. Similar situations arise in other service oriented environments as well.

The day-to-day management of employees and customers requires full attention and leaves little room for observation of events from a broader perspective, such as overall customer service and the interaction of customer events at the many customer points of activity within the enterprise (drive through order entry, drive through payment, drive through pickup, production area, drive through till, main service area and till, multiple entry areas, restrooms and parking lots, etc.). Especially in a large scale operation where economies of scale feature prominently in the profitability of an enterprise across many sites, the ability to understand customer and employee actions and interactions as they relate generally to the efficiency and the service quality of the enterprise is paramount.

By providing a means of both real time and extended time messaging and message analysis, based on the application of machine vision and machine intelligence techniques to the sensor data, the owner of such an enterprise can not only aid his employees and serve his customers better, but will also have a better understanding of the factors that affect the success or failure of the operation.

There are many similar scenarios appropriate to the invention having commercial and/or enterprise management value, of which this is only one. The example provided here is easily grasped, however, and therefore serves well to illustrate the invention in this disclosure.

Figure 1:
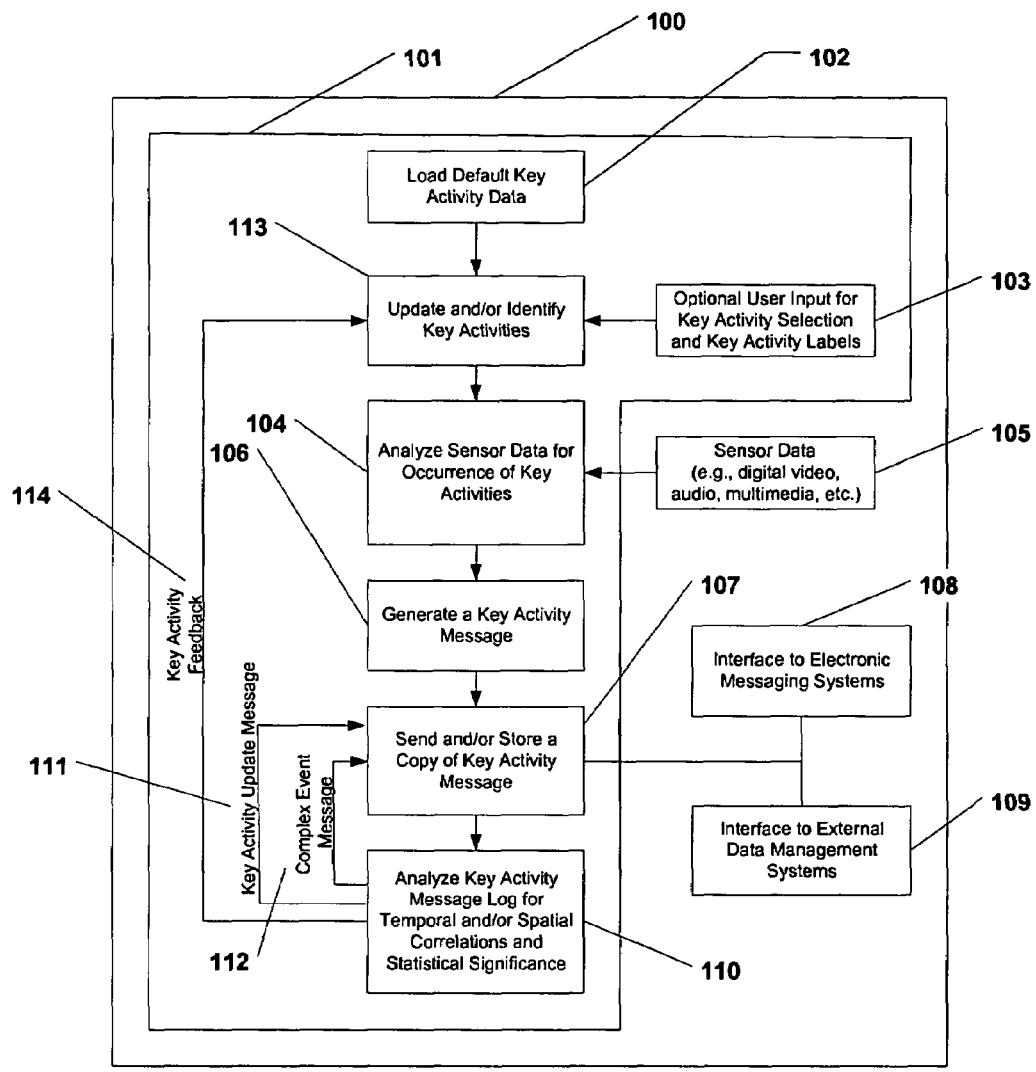
FIG. 1 shows the overall architecture of the invention and its primary components. Data from a sensor is operated on by the invention, shown at the top of this diagram, and is reduced to messages as the data flow through the system. These messages contain information of immediate and/or long term utility, and thereby are sent and/or used for subsequent long term processing, respectively. Interfaces are provided to outside systems for both messaging and for database operations. Finally, the user can input settings for the system to influence the processing, and can access data products from the database by the same means. As the invention exists to remove the necessity of ongoing data analysis in order to use the underlying algorithms, feedback is provided from the long-term analysis to the front end sensor data processing components.

The components of the invention and the underlying techniques are elaborated in the following paragraphs. As described above, a system of the present invention receives sensor data that is related to a key activity to the enterprise. FIG. 1 schematically illustrates the components and function of a system 100 according to the present invention. In the system of this invention, data are input to a computer 101 and likewise output from the computer. The invention functions by loading default key activity data 102 and/or having a user input key activity data 103 that then define the data analysis 104 that applies machine vision algorithms to input sensor data 105. These algorithms produce outputs in the form of a key activity message 106 when statistically significant events corresponding to key activities are detected. Such a key activity message can then be sent immediately or stored 107 for subsequent use. When the message is to be sent immediately, the computer uses an interface provided to external electronic messaging systems 108. To store a message, the computer uses an interface to external data management systems 109. For stored messages, comprising a message log, algorithms are applied periodically to detect statistically significant temporal and/or spatial correlations 110 that can then lead to additional key activity (update) messages 111, complex/combined event messages 112, or such algorithms can provide feedback useful for altering the key activity data 113 through the key activity updating/identifying 114 function.

Figure 2:
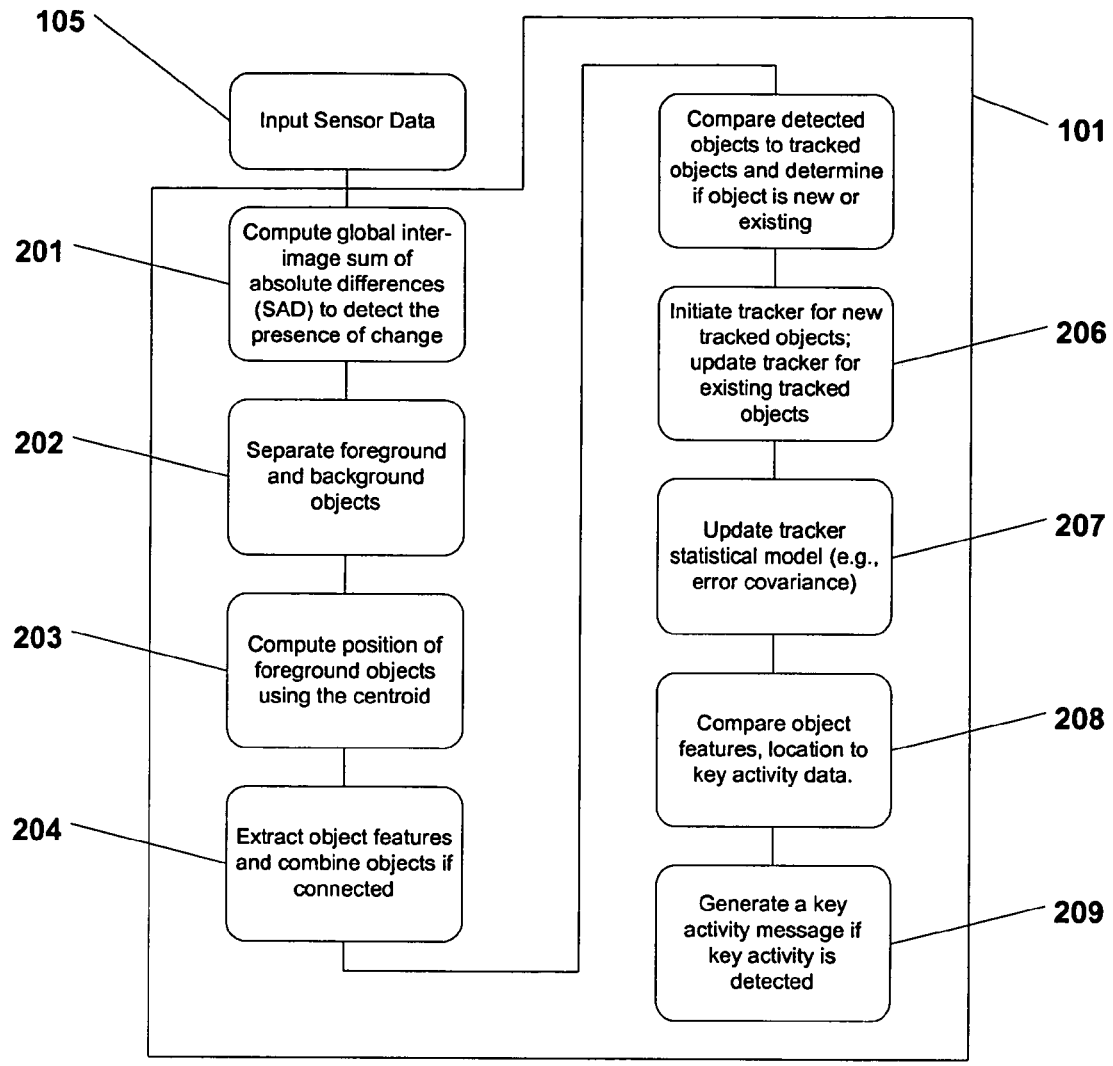
FIG. 2 illustrates one approach to the processing of sensor data in order to generate key activity event messages.

FIG. 2 schematically illustrates an example of the key activity analysis portion of the invention. This algorithm example begins with the input of sensor data 105 to the computer 101. The sensor data are then used to compute a sum of absolute differences across all sensor data points 201 between a prior point in time and the present time to detect statistically significant change; the sensor data points that are in the foreground (changing) can then be separated from those that are in the background (not changing), leading to foreground and background objects 202. These objects are then localized by computing a centroid 203 and additional object calculations are made to determine object features and combine those objects that are supposed to be connected 204. This algorithm then compares current objects to historical (tracked) objects and determines whether the object is new or an updated version of an existing object 205. For objects that are new, a new track is initiated 206 and for existing objects track updates are made 206. The tracker data having been updated, the statistical model used for tracking is then updated 207. Finally, prior to acquiring a new set of sensor data, the current set of objects, locations and feature data are compared to key activity data 208 so that a key activity message can be generated 209 if a key activity is detected.

Figure 3:
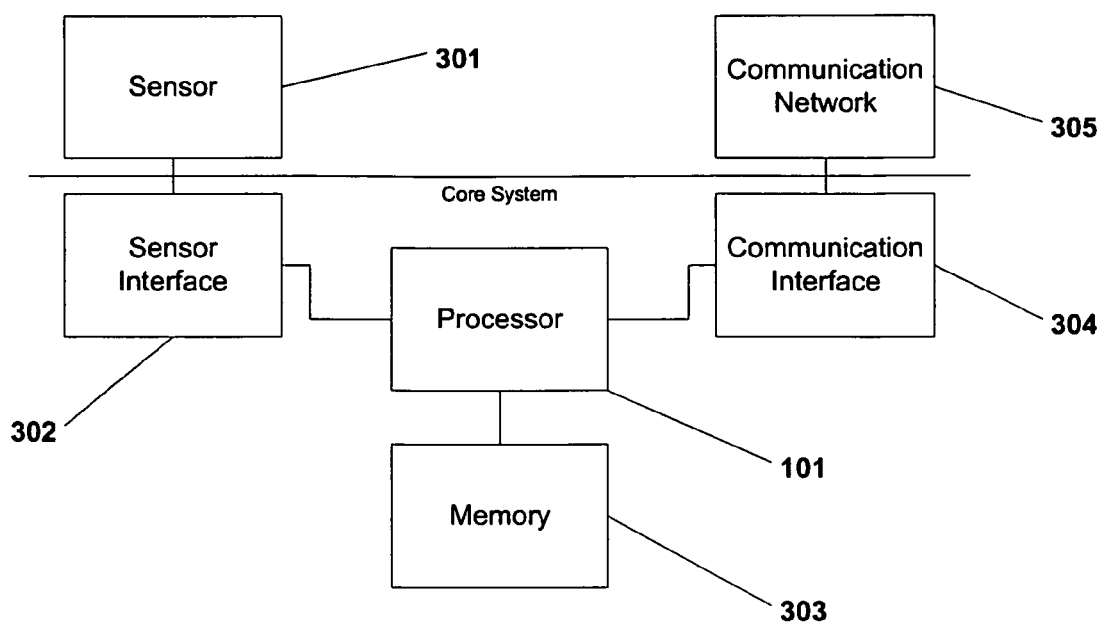
FIG. 3 shows the core elements of the processing system implied by the invention.

FIG. 3 schematically illustrates the core elements of the system level elements of the invention. The system is comprised of at least one sensor 301 that is connected via a sensor interface 302 to a computer 101 that contains memory 303 for storing sensor data and/or key activity messages. The computer is also connected through a communication interface 304 to a communication network 305 that provides a means of communicating key activities of the enterprise to the enterprise manager. As will be shown in subsequent examples, the computer function can also be distributed to multiple computer components (e.g., workstations, servers or portable computing devices). In this figure, the computer 101 function is located in a single component.

FIG. 4 schematically illustrates an example of the invention deployed in a client-server configuration wherein some of the software functional blocks that could be implemented, using some common software and graphical user interface (GUI) objects, are shown. This schematic designates the sensor data processing and message generation to the server (here shown as a web server); the GUI, data access, user configuration and message analysis/viewing capabilities are assigned to the client. In this illustration, all of the physical interfaces are integrated with the computer 101, and the functional blocks represent software objects that provide the computational interface to the physical interfaces; the software objects all run within the computer. The sensor data 401, here shown also as optional stored data 407, are input to the computer 101, and is made available to a dynamic link library (DLL) object that performs the key activity analysis 402; the messages that result from the key activity analysis are generated/handled by a message handling/storing DLL 403 that further has access to a database 404 into which messages can be placed for storage and management. A network interface object 405 provides a means of communication between the server and the client, and a configuration interface and executable 406 provides a means of allowing the client (user) to configure the invention. The processes are managed and facilitated on the computer by a server/system interface (wrapper) 408. The client side, which is separated from the server side by a dashed line 409, is essentially a GUI application that runs on either the computer 101 or on a separate/equivalent networked computer. The GUI client in this example of the invention consists of a main GUI window 410, a window for real-time data display 411, a window for setting user preferences 412 within the invention, a window for graphically viewing message data 413 such as a time series of event statistics, and finally the client GUI contains a configuration window 414 for the sensor and other key system components.

FIG. 5 schematically illustrates the invention deployed in an embedded (e.g., portable or similar) configuration in which the sensor, sensor data processing and external messaging interfaces are all integrated in a single module 501 that contains the computer 101 in which the sensor data are analyzed for occurrences of key activities, the sensor and corresponding sensor data 502 and message generation and communication components 503 that can use either a wired/wireless network connection 504 or a directly connected wired/wireless interface 505. In this embedded networked embodiment of the invention, a workstation computer 506 provides the means of loading default key activity data 507 and can also perform computations to update key activity definitions 508, which can alternately be updated via user inputs 509. The workstation computer can further analyze key activity message logs 510 by accessing a database 511 and the results can be communicated through an electronic messaging system interface 512 or an external data management system interface 513 so that a more distributed approach for the invention can be realized using one or more server 514 or server-like components. In this example some of the computer functions have been assigned/distributed to servers or workstation (both are computers) in the system.

FIG. 6 schematically illustrates a system level embodiment of the invention deployed across a wide area network such as the internet 601. In this example, the computer portion of the system occurs at multiple nodes on a network (meaning that the computing is distributed), the sensor data and some key activity analysis pre-processing occur at one network node 602, the completion of sensor data key activity analysis occurs at second node 603, the resultant key activity messages are stored in a message log database 604 on a server 605 at a third node, and the GUI for remote graphical analysis of key activity 606 is performed at a fourth network node. This example illustrates the modular design of the invention so as to facilitate its use in a highly networked environment.

Sensor data is quantitative information collected at a predetermined location and time at or near the enterprise, that can be used to deduce, using machine vision algorithms, events and key activities for the enterprise. Sensor data is collected at the predetermined location irrespective of object compliance, meaning that the information about the object deduced by the invention is gathered without the participation of the object, in contrast to information that requires participation of the object, such as would be the case for a typical biometric (e.g., fingerprint, face recognition, iris recognition, etc.) system.

An object is any physical entity, such entity being either animate or inanimate. Animate objects are regarded as being either animals/creatures, humans, or machines. Inanimate objects are regarded as being either man-made or natural. Man-made objects are further regarded as being either machines, structures, furnishings or implements (e.g., tools, weapons, to name a few).

Activity is motion in space and time such as would be observed by an object that is itself moving or is being moved, and includes the case for which no motion is occurring regarding an object.

An enterprise is a business, neighborhood, home, or other physical region or area of concern to one that is responsible for managing or monitoring activity within.

An event is a phenomenon that occurs in the scene of particular interest observed by the sensor that may be of particular interest to a particular user of the invention. A key activity is an event (or set of events) that the user determines is important, or that is deemed important by the invention through evidence of significance implied by the temporal and/or spatial behavior of event.

The following paragraphs elaborate upon the components of FIG. 1.

Description of the Default Key Activity Data

Key activity data are comprised of mathematical models that compactly represent human, vehicle, animal and inanimate object sensor data for events of interest to the enterprise. The default key activity data are those key activity data installed with (or within) a system that are known or anticipated to have relevance to the user of the system in advance of system installation. The purpose of these underlying models is to describe the default animate and inanimate objects that are of interest to the default user, in conjunction with the locations and times that are of particular interest for the specified objects.

These models will comprise of a set of general human features (e.g., body, limb, head, gait, etc.) and postures (e.g., standing, sitting, walking, running, jumping, lying, talking, waiving, writing, and other the patterns of movement), plus non-human but animate features and/or descriptors (e.g., canine, feline, aviary). For example, human body parts can be described mathematically in terms of connected ellipses (and other shapes) having areas in proportion to typical human proportions, and the way the ellipsoids (and other shapes) are connected in the sensor data can be used to determine a posture. Continuing the example, ellipsoids that have too small an area for a human shape and for which the connectivity of ellipsoids is more consistent with an animal than a human can be assigned an animate but non-human identifier.

If the mathematical descriptions of features and postures (e.g., shape, color, connectivity) are combined with the spatial behavior over time of these features and postures, more complex behavior can be ascertained from the sensor data. For example, again using the prior ellipsoid example, if ellipsoids that make up a human body are observed in the sensor data to traverse a space within the sensor field of view, the behavior of walking from one specific point to another is determined (e.g., walking from "point A to point B"). If, furthermore, accompanying these animate (human or non human) activity data are inanimate activity object models such as would normally be associated with the activity of humans and that would be important for understanding the specific human activity (e.g., automobile/sedan, automobile/pickup, leash/canine, wheelchair, etc.), additional complexity associated with the interaction of humans and these inanimate objects can be determined from the sensor data.

The models that make up the key activity data can be constructed in many ways, including, but non limited to, the ellipsoidal human shape models discussed earlier. Other mathematical descriptions of features in sensor data can include spatial (e.g., two-dimensional) histograms of foreground (e.g., moving) sensor regions of interest that indicate the number of distinct objects in a region; shape templates such as would be useful for matched-filter detection that allow for detecting objects in sensor data that are close to some reference shape (e.g., a matched filter that used a circular shape filter would be useful in detecting circular objects in sensor data); clustering and classification of objects by using feature vectors based on the sensor data (e.g., major and minor axes of ellipsoids as measures of aspect ratios); and frequency domain techniques such as the Fourier-Mellin transform, as an example, that can provide scale and rotation-invariant representations of sensor data that need to be represented compactly and compared to reference representations in order to assess how close a sensor data shape matches some known sensor data.

An example of another useful mathematical description, or model, of shape in sensor data is a contour-based model that is compact and facilitates a small computational burden. Many methods are available for this approach such as B-spline techniques for characterizing non-rigid shapes/features have been proven to be useful by some machine vision scientists. In this type of approach, for example, a moving (foreground) object is detected in sensor data and a B-spline curve is fitted to the profile of the object in the sensor data, and this spline is used to describe the position and trajectory of the moving object, thereby enabling a complex description of an object that is tracked/observed with the invention, and yet using a minimum of sensor data to describe it (the B-spline having a relatively compact representation for a set of dense sensor data points). However, other machine vision models can be applied in the invention as well.

Furthermore, models that describe rigid, non-human objects such as vehicles can be used to correspondingly detect, describe, track and generally monitor the activity of such vehicles. Human subjects are some of the more difficult to describe, and so are appropriate for this example discussion. However, the same computer vision methods and skills used to approach the detection and measurement of human activities would be generally applicable to the vehicular machine vision measurements.

In order to determine the more complex behaviors and interactions within the sensor data, the key activity data also include location, space and time data. The default location data are simply the fields of view of the sensors that are installed as part of the system, so that, unless the user manually specifies otherwise, all sensor data (e.g., pixels) will be equally important or have the same meaning. However, the user may specify locations (e.g., bounding rectangles or other regions of interest) that have importance as a region that is to experience significant activity, little activity or none, for instance.

Likewise, the default time data are simply the times of operation of the system, so that, unless the user manually specifies otherwise, all times will be equally important or have the same meaning when a system is first installed. As with the location data, the user can manually specify periods of particular interest for either high activity, low activity or none (e.g., a back entrance of a restaurant should be inactive during non-business hours, and events during those hours would be important at even single event levels).

Finally, the default key activity data will include classes of activity that combine both animate and inanimate data models and constitute a composite activity. For instance, the combination of walking events occurring within a doorway object would be class of event that is of interest to most users and therefore would be an appropriate default to include. Also, for example, the observation of the number of pedestrians waiting to cross a street, combined with the state of activity of vehicles (traffic) would represent such a combination of activities. Also, for example, the direction of movement may have significance where the direction of traffic through a one-way roadway has safety implications.

The key activity data also include location and time data. The default location data are simply the fields of view of the sensors that are installed as part of the system, so that, unless the user manually specifies otherwise, all sensor data (e.g., pixels) will be equally important or have the same meaning. However, the user may specify locations (e.g., bounding rectangles or other regions of interest) that have importance as a region that is to experience significant activity, little activity or none, for instance.

The key activity data thus described are best implemented as a data structure that is read into the system, though is it possible to conceive of other means of storing, retrieving and manipulating such data (e.g., as multiple single data type records, simple buffers, but not limited to).

Description of the Key Activity Identification and Update

This element of the invention provides a means of adding to the default key activity data either automatically (i.e., based on the data that are collected and analyzed subsequent to using the invention in deployed system) or manually. The manual addition of key activity data for the invention to monitor is achieved using an interactive user interface (e.g., graphical user interface, voice portal, or GUI) or its equivalent in the case where a graphical interface is not possible (e.g., a menu on a cell phone, computer monitor or dial-in phone portal). This GUI or equivalent is described in a subsequent section of this invention disclosure.

The automatic addition of data to the list of key activities is achieved by statistical inference from the analysis of the message log that accumulates as the system is operated. Isolated events that occur frequently (e.g., person walking through doorway), clustered events that occur frequently (e.g., group of people standing in line at the cash register), and isolated events that occur infrequently (e.g, person loitering by the back entrance to the restaurant late at night after business hours) are all examples of events that can lead to feedback to the data structure that identifies the key activity to the enterprise, to provide modification of the key activity data structure for the enterprise.

Description of the User Input of Key Activity Data

The invention already includes provision for default key activity data that are appropriate to the industry or setting in which it is deployed. However, it is anticipated that there will be particular activities, objects or classes of objects and/or events that will not be included in the default activities, yet are important to the user. Thus, the system includes the ability to select additional data elements from a pre-defined list, or to add custom data elements that the user obtains through independent means.

The input of key activity data by the user requires, at a minimum, a means of hearing or seeing a list of items to choose from and a means of choosing them, as would be the case for a voice portal menu (e.g., such as used in telephone transactions for banking), a computer monitor text menu, or equivalent. The preferred embodiment, where possible, is to use a graphical user interface (GUI) such as would be possible with a personal computer, or any terminal-like device that can display graphical content and allow for a user to select/enter data.

For example, the GUI might use a list of selected checkboxes that are initialized to the default settings, but include unselected boxes that can be used instead of or in addition to the defaults. Furthermore, the GUI, in order to facilitate the inclusion of additional model data, would have a button or other control that enables the user to load model data that are compatible with the particular data structure in use.

In addition to the key activity data (the models and associated parameters), the user can input the locations of system components for use in spatial correlation and the location in the sensor data of objects of particular interest, even if the user is not able or interested in specifying a model for objects thus specified. In the case of a GUI interface, this selection of objects can be as simple as drawing an enclosing rectangle or other shape with a point device such as a mouse. Clearly, such data can also be entered through a less sophisticated interface (e.g., a voice portal) but the entry of such data becomes cumbersome, so that the GUI is again the preferred embodiment.

Description of the Sensor Data

The invention uses sensor data (e.g., digital video data, infrared data, microwave data, other multimedia data including but not limited to audio) from user selected sensors that provide information about the enterprise of concern. The sensor data can originate from a single sensor or multiple sensors, and can be co-located with other parts of the invention or can originate in remote, networked locations. The sensor data, by virtue of either a unique connection (e.g., data port) on the sensor data analysis computer resource (e.g., server or desktop computer) or by virtue of a unique sensor identifier (e.g., a sensor serial number or watermark placed on its data prior to transmission of the data to the sensor data analysis computer resource) must be associated with a particular location, as the location of events derived from sensor data is an important component of the key activity data.

Sensor data is collected at the predetermined location irrespective of object compliance, meaning that the information about the object deduced by the invention is gathered without the participation of the object, in contrast to information that requires participation of the object, such as would be the case for a typical biometric (e.g., fingerprint, face recognition, iris recognition, etc.) system. For instance, if a sensor were placed so as to observe the activities of a person roaming the aisles of a retail enterprise, significant information about the human object features could be measured that accurately describe the human object without the knowledge of the object, let alone the participation of the object; participation would require the object to pose, to somehow collaborate with the measurement, or otherwise facilitate the gathering of the activity information.

It is envisioned that automatic localization of sensors will be useful in situations where sensor fields of view overlap, and where at least one sensor in a group of sensors is in a known location, so that user specification of location will be at a minimum. However, it is anticipated that most enterprises using the invention will benefit from having a user specify the location of the sensors individually upon installation, thereby explicitly forming the association between the data from a particular sensor and its unique location and/or field of view.

Description of the Analysis of Sensor Data for Occurrence of Key Activities

This aspect of the invention involves the application of machine vision and machine intelligence algorithms to the sensor data (e.g., digital video image sequences or individual images) including, but not limited to the following algorithm elements:

1. Detection of change in the sensor data indicating the possible occurrence of an event.

2. Detection and separation of background (e.g., stationary or unchanging in a statistically significant way) objects and foreground (e.g., moving or changing in a statistically significant way) objects in the sensor data, using statistical foreground and background models (e.g., empirical, analytical or semi-empirical representations of the behavior of sensor data).

3. Extraction of features associated with detected objects and generation of data (e.g., metadata) that describe the objects with regard to the sensor data at a particular point in time (e.g., a single image in a video image sequence, or some other time series of sensor data).

4. Substitution of the extracted features (e.g., metadata) for the original sensor data as a more compact representation of the sensor data, which is of particular importance when computer data storage (e.g., memory such as dynamic random access memory). This can be viewed as a form of compression of the input data, and the invention includes the use of compression (and eventual archiving of compressed data) of the sensor data.

5. Localizing and tracking of foreground objects. Localizing involves computing the location of objects as indicated by the placement in the sensor data (e.g., the centroid of a grouping of sensor pixels in a digital image, to name one possible approach). Tracking involves the measurement of location, the measurement of the statistics (e.g., mean, variance, covariance) of motion, including but not limited to velocity and acceleration. Tracking can be used to maintain information in the past location of an object, the current location of an object and also to predict future locations.

6. Detection of events (phenomena that occur in the scene of particular interest viewed by the sensor that may be of particular interest to a particular user of the invention).

7. Detection of key activity, by comparing event data to key activity data (e.g., a sequence of events or single event that corresponds to phenomena of particular interest to a user).

8. Adjusting the foreground and background sensor data models to accommodate changes in the corresponding background or foreground statistics (e.g., a new inanimate object is placed on the floor within the field of view of the sensor, thereby becoming part of the background if it remains for an extended period).

There are numerous approaches that can be taken to provide the analysis functions listed above, many of which have been published (e.g., IEEE Proceedings of Machine Vision and Pattern Recognition). Furthermore, there are many combinations of differing techniques for individual parts of the foregoing analysis sequence that can be used and that will have varying levels of performance for the particular enterprise management scenario.

For example, a very simple system to detect and track a human in a sensor data sequence might involve: computing differences between sequential sensor data (e.g., sequential images in a video sequence) that indicate sensor data that are changing enough to indicate motion; filtering these differences (e.g., applying a Gaussian matched filter to smooth the difference image) to reduce susceptibility to random events and thresholding the filtered data to yield sensor data regions that are undergoing significant change; identifying contours in the thresholded data and extracting the locations of the contour points; using the contour points to describe the area enclosed within contour(s) and also determining the major axes of the contour(s); deciding based on the contour(s) thus calculated whether the shape could be a human; if human-like, computing a centroid of the contour(s) that can be used to track the contoured object (understood at this point to be human-like) from one sensor data set to the next in time by measuring the centroid of the object over time and using this history to both form an accurate estimate of where the object (human) is and to predict where it is going, based on velocity (motion per unit time). If the human object approaches an area that is ostensibly off limits, a message could be sent to the enterprise manager indicating that such an event has occurred or is about to occur. This is a very simple application of the invention, but helps to illustrate some of the underlying concepts.

More sophisticated techniques are envisioned as well. For instance, in the feature extraction and object tracking parts of the invention, one might use statistical hypothesis testing that robustly accommodates multiple hypotheses for foreground objects. Other approaches, including, but limited to fuzzy logic and neural network models, can be applied to this invention successfully, and are envisioned for use.

The result of the application of the analysis algorithm to the sensor data is an output event and event and/or key activity data record that contains data that may contain, but are not limited to, the specific nature of the event, the event time, position, type and spatial and temporal nature of the object. These will vary somewhat with the particular algorithm chosen to detect the objects, but could include, for example, the velocity, vector gradient data such as the divergence and curl, and spectral behavior of the object if such data are available from the sensor.

In the case that the type of object closely matches that of a key activity/object model, this type identity will be declared as part of the output; however, it is envisioned that, from time to time, the identity of an object will not be known and will be left as an unknown, to be determined later, or that the event is simply unknown but, owing to availability of message storage capacity, is submitted for message generation in order to facilitate the discovering of new key activities based on the analysis of event and message data over time. The output data record may also include the statistical certainty of the analysis data products, e.g., the likelihood ratio in the case of the preferred embodiment that utilizes statistical hypothesis testing to detect and classify objects.

Description of the Generation of Key Activity Messages

Since the purpose of the invention is, in part, to communicate events and behavior as observed with a sensor or group of sensors to users of the invention, the output data record(s) from the analysis algorithm can be used to generate messages that represent a decision to store the event as declared. The decision as to whether or not to generate a message, or message generation logic, is made based on the statistical significance of events and may include the preferences of the user as to the level of statistical significance that is required before a message is generated (e.g., the user may specify that events must have a probability of false alarm of less than 1 per hour, which would then directly affect the threshold setting for the test statistic used in the likelihood test, in the case for which that particular class of test is used).

Once the decision to generate a message has been made using the message generation logic, the data produced by the sensor data analysis algorithm are formatted for use by both the data storage (e.g., database or other organized means of storage) and messaging modules (e.g., email, instant message, or other means of communicating the message) and sent to one or both of these modules. It is recognized that some applications of the invention may not have adequate data storage facility to store all the messages that are generated, but will merely want to send a message (e.g., electronic message) that can be used and/or discarded by the message recipient (e.g., either a person or a server-like computer that can make further use of the message thus generated). However, the preferred embodiment involves the storage of the message in a known location so that additional processing can be performed on the stored messages (the message log) to deduce more complex, long-term activities across many activities and locations being observed.

As described in the sensor data analysis portion of the invention, the preferred embodiment also involves the storage of events that do not necessarily match a known key activity. The storage as messages of these events that are in some way unknown or otherwise regarded as insignificant provides a means of automatic or semi-automatic learning by the user about the events that take place in the enterprise of interest. Such event messages could thus be stored, with appropriate descriptors in the stored data to indicate that the event is in some way unknown or incompletely determined.

On the Use of Encryption

Encryption is used in the invention as a means of protecting the sensor data and/or messages that are generated from observation by those outside the base of intended users. Since it is clear that the invention could be used in situations where confidential events are observed (e.g., closing the bank till, locking or unlocking the entry to a retail establishment) the use of encryption to protect data and/or message traffic is important for providing a high level of customer service. Encryption would occur in any deployment of the technology at the point where the data and/or key event messages are generated. Once the data and/or message is at a trusted party on the other side of the network, decryption can be implemented, thereby providing a secure data pipe for the transaction. There are many possible methods of providing the encryption, such as that currently employed by the secure socket layer (SSL) protocol that has found widespread use on the internet, to name one common example.

Description of the Sending and/or Storing of Key Activity Messages

Based on the input from the user regarding messages, the messages received from the message generation component of the invention will be stored in a predetermined location or locations (e.g., local memory, local or remote database on mass storage media) and/or placed in a message queue for a messaging system having an interface to public or proprietary messaging system.

Thus, this element of the invention is essentially an interface to databases and message handlers. The preferred embodiment will encompass both a private database that facilitates the ongoing analysis of message data, an external commercially-available database (e.g., SQL or equivalent) for occasional on-demand access by the user and/or user-approved analysts, and a commercial message proxy service that allows a single interface to multiple instant message (e.g., AOL) and simple message (e.g., Vodaphone) standards, thereby removing the need to incorporate such standards into the system.

Description of the Electronic Messaging Systems Interface

This element of the invention is essentially a queue for messages that accommodate a commercial or proprietary standard for messaging, including email, instant messaging and SMS (simple messaging system) data such as is used for mobile phones. It is envisioned that the invention may need to send proprietary messages to non-public resources (e.g., a microcontroller on a private or public network that can receive such messages and controls hardware that needs to be triggered by the information generated with the invention). However, the preferred embodiment uses a standard messaging interface/method so that system complexity and instability for the user is minimized.

Description of the External Data Management Systems Interface

This element of the invention is essentially a data storage (e.g., database) interface for writing message data records. As with the electronic messaging component of the invention, it is envisioned that non-standard proprietary interfaces may be necessary, but the preferred embodiment relies on commercially available standards to that the user experience is as simple and uncomplicated as possible, given the overall goal of the invention to provide advanced technology to those not having machine vision or other advance technology expertise.

Description of the Analysis of Key Activity Message Logs

The purpose of this element of the invention is to analyze the stored event and key activity messages for statistically significant combined, or complex, activities (e.g., events that are comprised of multiple messages separated by time or location) and multiple event cross-correlations (e.g., events that happen in the same region of interest, at the same time in the same region of interest, or at the same time in different regions of interest). Thus, the invention allows for multiple events (i.e., unknown or incompletely determined) and/or key activities to be analyzed for the occurrence of more complex key activity than can be detected by the aforementioned analysis of sensor data for key activity. This accommodates for, for instance, patterns of long term key activity that the user is interested in or patterns of key activity across many sensors, but that require a sequence or combination of key activities over time and/or locations to substantiate. The output of such correlation can be fed back to the data structure that identifies key activity to the enterprise, to enable modification of the data structure that identifies key activity to the enterprise.

As with the sensor data analysis that occurs for all sensor data, this element can be implemented in many ways, given the intense activity in such data mining and related technology in recent years. However, the preferred embodiment again is to rely upon robust statistical hypothesis testing methods that allow for characterization of multiple hypotheses and that do not necessarily rely upon a priori specification of event statistics (e.g., a normal distribution is not generally appropriate for detecting and tracking events that lie well away from a prominent mode of a probability density function).

Description of the Generation of Key Activity Update Messages

Using existing key activity messages and/or stored unknown event messages, temporal or spatial patterns of event messages will, from time to time, occur. To the extent these patterns may be indicative of new and/or unknown (but potentially important) events occurring in the enterprise, new key activities can be automatically or semi-automatically added to the list of key activities used in the invention. As the user has the ability to specify and/or change the key activities that are used, the user is free to reject key activity updates that are generated automatically. Alternately, the user may adjust, through the key activity selection facility, the parameters controlling the uniqueness of key activities, so that the system will not generate new key activity messages based only on minor and insignificant variations in the patterns of event messages analyzed.

Description of the Generation of Complex Event Messages

As some of the key activities of interest to the user may be comprised of an ensemble (more than one) of key activities, either a sequence of the same key activity and/or a combination of multiple key activities (e.g., distributed temporally or spatially), the invention can form complex event messages that the user specifies or that become apparent through the message update mechanism (see prior paragraph). These complex event messages are handled the same as the simpler key activity messages, once generated.

Example Illustrations

Examples of possible embodiments of the major features delineated in FIG. 1 are provided in FIGS. 2-5, which are described in the following, in relation to FIG. 1.

FIG. 2 shows an example of a simplistic way that sensor data (assumed to be digital video, or sequences of digital images or frames) can be processed in order to generate key activity event messages. This is a simplistic example of some of the computations described in FIG. 1 as "Analyze Sensor Data for Occurrence of Key Activities" and also "Generate a Key Activity Message."

Given sensor data are input to the key activity analysis computer program, sequential frames are subtracted and a sum of absolute differences (SAD) is calculated. If this SAD value is large enough, then it is presumed that change has occurred in the image and further computations are worthwhile. For images in which change has thus occurred, the background (stationary) sensor data are separated from the foreground (moving) sensor data using one of the many methods that have been demonstrated in the open literature.

The problem of separating the background from the foreground is well studied. Simple techniques involve only the subtraction of a mean level. More sophisticated techniques can involve the statistical characterization (e.g., measuring the mean, variance, other moments of the sensor data) of each sensor data element (e.g., each pixel from a focal plane array sensor) to determine those data elements (e.g., pixels) that are changing from those that are not, based on the variance or variability of a pixel over some pre-determined length of time (e.g., the past few seconds, the past few minutes—whatever length of time is appropriate to the enterprise management scenario of concern). It is envisioned that some applications will be able to use even the simplest of background/foreground separation techniques, and that some will require more sophisticated ones. However, there are ample methods that have been demonstrated, and based on the requirements of a particular enterprise management scenario, more or less sophisticated means can be used to achieve satisfactory performance for use with this invention.

Having separated the foreground from the background, the foreground data can be analyzed to localize, or compute the position of, foreground objects. Subsequently, the foreground objects are analyzed for features, and if multiple objects are detected and found to be part of a larger whole (e.g., connected component analysis), these components can be connected/associated and thereby associated with the appropriate objects.

Having extracted features and formed composite objects as necessary, the tracking algorithm ("tracker"; a tracking algorithm simply keeps track of where an object is, and is typically capable of predicting future object locations based on prior object location history) is applied and the detected objects can be compared to existing tracked objects so that new objects can begin to be tracked and/or existing objects can have their tracks updated. Once the objects have been handled in terms of detection and tracking, the statistical model used for the tracker can be updated; this generally involves updating the error covariance for the tracked objects, updating the stored current locations and updating the predicted track for the next instance of sensor data.

Finally, the features and location of the object can all be compared to the key activity events of interest in order to make a determination as to whether a key activity event has occurred. If such an event has occurred, a message is generated.

FIG. 3 shows the core elements of the processing system for practicing the invention. At a minimum, the system must have a processor (e.g., a microcomputer, digital signal processor, or application specific integrated circuit); some storage or memory that allows for computer programs to be run, sensor data to be manipulated and stored and also to enable the storage of messages generated from the short- or long-term analysis of sensor data and key activity data; interfaces for both communicating the outputs of the invention and for the acquisition of the sensor data.

FIG. 4 shows an example of the invention deployed as a client-server application that would run on conventional client (e.g., desktop or mobile computer) and server (e.g., web server, local area network server such as found in a typical enterprise setting). In particular, this figure shows how some of the elements of FIG. 1 can be assigned to computer executable modules, shown here for example as dynamic link library (DLL) modules such as would be commonly found on a modern computer.

The figure is separated into two halves by a dashed line. The upper portion is the server part and the lower portion is the client part. The server contains a DLL that handles the key activity analysis and also one for handling the generation and handling/storing of messages. The server side in this example also has the interface to the sensor and/or stored datafiles (e.g., AVI), the data from which are fed to the analysis DLL. Furthermore, the server provides the means of controlling and maintaining the configuration of the system (sensors, events of interest, other system particulars) through its configuration interface. The server also provides a network interface for the executable components, which are all accessible through a interface module (sometimes called a wrapper) and the network module (e.g., TCP, or transport control protocol). Finally, the server provides the interface to the database that contains the message data archive, and which, through the database DLL can perform the necessary computations to deduce statistical significance of complex events and of new/recurring events logged in the database.

The client side illustrates the typical range of features that would be expected if the invention were accessed by a user from the client side through a typical desktop computer operating system interface (e.g., Microsoft Windows), and where tools relating to analysis, settings, configurations, sensor data viewing and the like are all provided. Windows or interfaces are provided to the user for configuring the system (selecting/determining key activities), for setting preferences, for viewing results from the database DLL and for viewing a variety of data generated through the system.

FIG. 5 Shows the invention deployed in an embedded configuration, which occurs when it is necessary to reduce the raw sensor data (a form of compression) prior to transmitting the data across a network, where both security and bandwidth may be significantly lower than in a setting where all the system components are contained within a single building/structure). In this embedded example, all of the initial key activity analysis of sensor data is provided by an application specific integrated circuit (ASIC) or equivalent general purpose programmable processor (e.g., microprocessor, digital signal processor) so that only the reduced data are sent across the wired or wireless network to the destination message recipient and/or the database storage element.

In this figure, the major elements of FIG. 1 are all visible. However, they are distributed across a network and some (the analysis of activities and the message generation) are embedded in a module that contains the sensor that is providing the data to analyze. A direct connection from an outside wireless or wired device is also shown here, since it is envisioned that direct messaging from such an embedded module to an outside device (e.g., held by a person for whom the messages are intended) will be very convenient to a user that is, for example, in a remote location without adequate network infrastructure.

While it is not explicitly shown, this example is one that has an obvious benefit from the inclusion of encryption, which would occur at the output stage of the ASIC, just as the key activity message is generated. Once the message is at a trusted party on the other side of the network, decryption can be implemented, thereby providing a secure data pipe for the message transaction. There are many possible methods of providing the encryption, as an example, such as that currently employed by the secure socket layer (SSL) protocol that has found widespread use on the internet. The remainder of the system shown in this example closely follows the logic of FIG. 1, and can be readily understood in that context.

FIG. 6 illustrates the modular design of the invention, which allows it to be deployed in many settings, such as those described in FIGS. 3 and 4. The invention is structured so that the sensor data, the sensor data processing, the message database and the message data processing and access can all take place on separate, networked resources. For example, in this figure, the sensor (lower left corner) is deployed remote to the rest of the system but having a network connection for the sending of either raw sensor data or reduced data (via an ASIC for example). The sensor data herein are transmitted to the sensor data analysis computer shown on the upper right, which generates messages that are logged by yet another server in a message log database (lower right). This (lower right) server also can run database and statistical applications to serve up data results of interest to a user of the invention. Finally, the user can make requests for such results from a remote, but networked, location via a portable computer (e.g., laptop), as shown in the upper left.

This overall structure is important given the overall objective of the invention to facilitate the use, by non-specialists, of sophisticated machine vision and data mining algorithms. As these sophisticated algorithms can be run and managed on systems for which the user of the data products (messages) need not have responsibility, the user can be freed to focus on understanding the content of messages.

The invention claimed is:

1. A system for use in managing activity of interest within an enterprise, comprising a computer having a model for tracking one or more human objects in a scene related to the enterprise and configured to
   (i) access key activity data comprising object data related at least to the human features, locations, movement patterns, and predetermined other human activity of a human object relative to other physically and visually distinct objects in a scene related to the enterprise,
   (ii) receive sensor data that is taken in by a sensor of a predetermined scene related to the enterprise,
   (iii) extract solely from the sensor data changes that enables separation of foreground and background objects, including human objects, localization of human object features, and connection of object features that should be connected,
   (iv) classify the extracted objects, including extracted human objects, in plurality of classes of objects of different features, shapes, movement and behavioral patterns,
   (v) determine whether a human object is new to the human object data in the computer and initiating tracking of the new human object and if the human object exists as object data in the computer updating a track of the existing human object, and update the computer model in accordance with the foregoing, and
   (vi) compare human object data to key activity data and produce a key activity message, wherein the key activity message contains any or all of the following elements: what is moving or changing, a person, animal, machine, or other inanimate object; what behavior the moving or changing object is engaged in; where the object is located; when the motion or change is occurring and measurable interpretation of the change in phenomena or activity in order to make a decision by a machine or a human for a purpose.

2. A system as defined in claim 1, wherein the computer is configured to make a preliminary determination from the sensor data as whether to extract from the sensor data one or more human objects and the state of activity for each human object with respect to the state of activity of other physically distinct objects in the sensor data, irrespective of objective compliance.

3. A system as defined in claim 2, wherein in extracting from the sensor data the human object and the state of activity for the human object with respect to other physically distinct objects in the sensor data, irrespective of object compliance, the computer is configured to determine if the human object has been previously extracted from sensor data or is being initially extracted from the sensor data.

4. A system as defined in claim 3, wherein the computer is configured such that after the computer has processed the key activity data and the extracted human object data and determined whether to produce output that is related to the key activity, the computer is configured to receive additional sensor data taken in by the sensor of the predetermined scene related to the enterprise, extract from the additional sensor data a human object and the state of activity for the human object with respect to the state of activity for other physically distinct objects in the sensor data, irrespective of object compliance, and process the key activity and the extracted data from the additional sensor data and determine whether to produce output that is related to the key activity.

5. A method for use in managing human activity of interest within an enterprise, comprising:
   a. providing a computer configured to:
      (i) access key activity data comprising data related to activity of a human object relative to other physically and visually distinct objects in a predetermined scene related to the enterprise,
      (ii) receive sensor data that is taken in by a sensor of a scene related to the enterprise,
      (iii) extract solely from the sensor data a human object and the state of activity for the human object with respect to the state of activity for other physically and visually distinct objects in the sensor data, Irrespective of object compliance, including separation of foreground and background objects, including human objects, localization of human object features, and connection of human object features that should be connected, and
      (iv) process the key activity data and the extracted data to produce output that is related to the key activity;
   b. inputting to the computer sensor data that is taken in by a sensor of a scene related to the enterprise;
   c. extracting solely from the sensor data, via the computer, a human object and the state of activity for the human object with respect to the state of activity for other physically and visually distinct object in the sensor data, including human objects, localization of human object features, and connection of human object features that should be connected;
   d. processing the key activity data and the extracted data to produce output that is related to the key activity, wherein the output comprises of any or all of the following elements: what is moving or changing, a person, animal, machine, or other inanimate object; what behavior the moving or changing object is engaged in; where the object is located; when the motion or change is occurring and measurable interpretation of the change in phenomena or activity in order to make a decision by a machine or a human for a purpose; and
   e. storing the detected activities in a database for extraction and use in a decision support system.

6. A method as defined in claim 5, wherein a preliminary determination is made, via the computer, from the sensor data as to whether to extract from the sensor data the human object and the state of activity for the human object with respect to the state of activity of other physically distinct objects in the sensor data, irrespective of objective compliance.

7. A method as defined in claim 6, wherein in extracting from the sensor data the human object and the state of activity for the human object in the scene with respect to other physically distinct objects in the sensor data, irrespective of object compliance, the computer determines if the human object has been previously extracted from sensor data or is being initially extracted from the sensor data.

8. A method as defined in claim 7, wherein after the computer has processed the key activity data and the extracted data and determined whether to produce output that is related to the key activity, the computer (i) receives additional sensor data taken in by the sensor of the predetermined scene related to the enterprise, (ii) extracts from the additional sensor data a human object and the state of activity for the human-object with respect to the state of activity for other physically distinct objects in the sensor data, irrespective of object compliance, (iii) processes the key activity and the extracted data from the additional sensor data and determines whether to produce output that is related to the key activity and (iv) update the already stored information of the key activity of the object.

* * * * *

UNITED STATES PATENT AND TRADEMARK OFFICE
CERTIFICATE OF CORRECTION

PATENT NO. : 7,617,167 B2
APPLICATION NO. : 10/820906
DATED : November 10, 2009
INVENTOR(S) : Griffis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 795 days.

Signed and Sealed this

Nineteenth Day of October, 2010

David J. Kappos
*Director of the United States Patent and Trademark Office*